United States Patent
Brady et al.

(12) 
(10) Patent No.: US 7,514,004 B1
(45) Date of Patent: Apr. 7, 2009

(54) IN-TANK RECIRCULATING ARSENIC TREATMENT SYSTEM

(75) Inventors: Patrick V. Brady, Albuquerque, NM (US); Brian P. Dwyer, Albuquerque, NM (US); James L. Krumhansl, Albuquerque, NM (US); Joseph D. Chwirka, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 12/113,354

(22) Filed: May 1, 2008

(51) Int. Cl.
*C02F 1/42* (2006.01)
(52) U.S. Cl. ........................ 210/688; 210/196; 210/263
(58) Field of Classification Search ................ 210/196, 210/263, 688
See application file for complete search history.

(56) References Cited

U.S. PATENT DOCUMENTS

| | | | | |
|---|---|---|---|---|
| 2,723,761 A | * | 11/1955 | Van Der Made et al. .... | 210/196 |
| 4,280,912 A | * | 7/1981 | Berry et al. ................. | 210/662 |
| 4,332,685 A | * | 6/1982 | Nowlin et al. ............... | 210/638 |
| 4,734,201 A | * | 3/1988 | Watanabe .................... | 210/685 |
| 4,806,236 A | * | 2/1989 | McCormack ................ | 210/94 |
| 4,917,806 A | * | 4/1990 | Matsunaga et al. .......... | 210/662 |
| 5,281,333 A | * | 1/1994 | Bernhardt ............... | 210/170.07 |
| 7,303,666 B1 | * | 12/2007 | Mitsis ........................ | 210/106 |
| 7,309,425 B2 | * | 12/2007 | Bandyopadhya et al. .... | 210/196 |
| 2002/0036172 A1 | * | 3/2002 | Del Signore ................ | 210/748 |
| 2002/0141827 A1 | * | 10/2002 | Breeding ............... | 405/128.75 |
| 2003/0010720 A1 | | 1/2003 | Chwirka | |
| 2005/0000915 A1 | * | 1/2005 | Yokosawa et al. ........... | 210/749 |
| 2007/0246429 A1 | * | 10/2007 | Jones et al. ................. | 210/685 |

* cited by examiner

*Primary Examiner*—Chester T Barry
(74) *Attorney, Agent, or Firm*—Robert D. Watson

(57) ABSTRACT

A low-cost, water treatment system and method for reducing arsenic contamination in small community water storage tanks. Arsenic is removed by using a submersible pump, sitting at the bottom of the tank, which continuously recirculates (at a low flow rate) arsenic-contaminated water through an attached and enclosed filter bed containing arsenic-sorbing media. The pump and treatment column can be either placed inside the tank (In-Tank) by manually-lowering through an access hole, or attached to the outside of the tank (Out-of-Tank), for easy replacement of the sorption media.

22 Claims, 8 Drawing Sheets

IN-TANK RECIRCULATING ARSENIC TREATMENT SYSTEM

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

Small water systems (~100 connections or less) with ambient arsenic (As) levels of 11-25 ppb might achieve low cost compliance with the new US arsenic limit of 10 ppb by using in-tank arsenic filtration. In-tank filtration (i.e., treatment) utilizes a pump to recirculate arsenic-laden water through a small vessel (i.e. filter cartridge, column) containing commercially available arsenic adsorption media. Theoretical calculations and pilot testing indicate that for small water systems in-tank arsenic removal is substantially more efficient and less costly than conventional arsenic removal approaches primarily because it requires a significantly smaller installation and less operation and maintenance.

On Jan. 22, 2001, the United States Environmental Protection Agency (USEPA) published a revised standard for arsenic in drinking water, lowering the level from 50 µg/L to 10 µg/L (US EPA, 2001) effective January 2006. All community and non-transient, non-community (NTNC) water systems, regardless of size are required to achieve compliance with the new arsenic standard (USEPA, 2003). This regulation represents one of the first rules under the 1996 Safe Drinking Water Act (SDWA) amendments that significantly impacts small and rural water systems. An estimated 3,000 community water systems (CWS) and 1,100 NTNC water systems need to take measures to lower arsenic in drinking water. The USEPA has estimated the annualized cost for public water supplies to install and maintain arsenic-treatment systems to be $195 million/year. Another cost analysis conducted by the American Water Works Association Research Foundation (AWWARF), reported an annualized cost estimate of up to $495 million per year.

EPA has estimated the cost to consumers of small water systems (serving less than 3,300 people) to range from $58 to $327 per household/year. Other estimates are significantly higher. For example, in New Mexico costs to comply with the new arsenic regulation are estimated to be $374 to $436 million/year for capital outlay and between $16 and $21 million/year for operation and maintenance costs. This translates into estimated consumer monthly costs of $38 to $42/month for large systems and $91/month for small systems.

The New Mexico Environmental Department (NMED) Drinking Water Bureau has identified 96 water systems possessing 100 connections or less which exceed the new arsenic standard. In the past, the only water treatment these small water systems have conducted is disinfection, usually involving the addition of sodium hypochlorite or chlorine gas to the water prior to storage/distribution. Systems with water containing more than the new 10 µg/L arsenic level must now install and operate a treatment system for the first time. Available technologies for arsenic removal including fixed bed adsorption, ion exchange, and coagulation/filtration require substantial capital outlays for facility construction and operations and maintenance (O&M).

Cost estimates for a new fixed-bed adsorptive arsenic removal system can be derived from the USEPA cost estimating guidance and in this instance are based on a community having 100 or fewer people equivalent to a design flow rate of 0.02 MGD (million gallons per day) and an average flow rate of 0.01 MGD (USEPA, 2000). This EPA guidance corresponds with a year 2000 study that found the average water use in southwestern cities to be 200 gallons per day per person. Based on the USEPA costing, a community of 100 people would incur capital and O&M costs of approximately $159,020 and $9,026, respectively for a new granular iron media (GIM) arsenic treatment facility. The capital and O&M unit costs are $7.95/gpd (based on 0.02 MGD design flow) and $2.47/1000 gallons (based on 0.01 MGD average flow). A coagulation/filtration (C/F) system would also involve similar capital outlay costs; however, O&M costs would be significantly higher especially for small-scale systems. A C/F system becomes cost effective for water systems treating 0.5 MGD or greater.

Recent improvements in arsenic treatment have focused on the media, despite the fact that the cost of arsenic adsorption media is a minor component of the arsenic removal facility. In the example above the media cost accounts for approximately 5% of the capital cost and 37% of the annual O&M cost. This invention is directed at reducing capital and O&M costs by removing the arsenic while the water is inside the community water storage tank.

SUMMARY OF THE INVENTION

A low-cost, water treatment system and method for reducing arsenic contamination in small community water storage tanks. Arsenic is removed by using a submersible pump, sitting at the bottom of the tank, which continuously recirculates (at a low rate) arsenic-contaminated water through an attached and enclosed filter bed containing arsenic-sorbing media. The pump and treatment column can be either placed inside the tank (In-Tank) by manually-lowering through an access hole, or attached to the outside of the tank (Out-of-Tank) for easier replacement of the sorption media.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

This invention is directed at a method and system for reducing capital and O&M costs by continuously removing arsenic while the water is inside a community water storage tank. The water in the tank is continuously recirculated, at a significantly greater velocity than conventional adsorption, through a treatment (filter) column filled with arsenic adsorbing media. This concept can be implemented by either a remotely powered treatment device weighing at most 120 lbs. attached external to the side of the water tank, or by an in-tank system manually lowered into the tank. Because the water is recirculated multiple passes (at least two or more times) through the treatment column, this system is not a 'once-through' treatment system.

Figure 1:
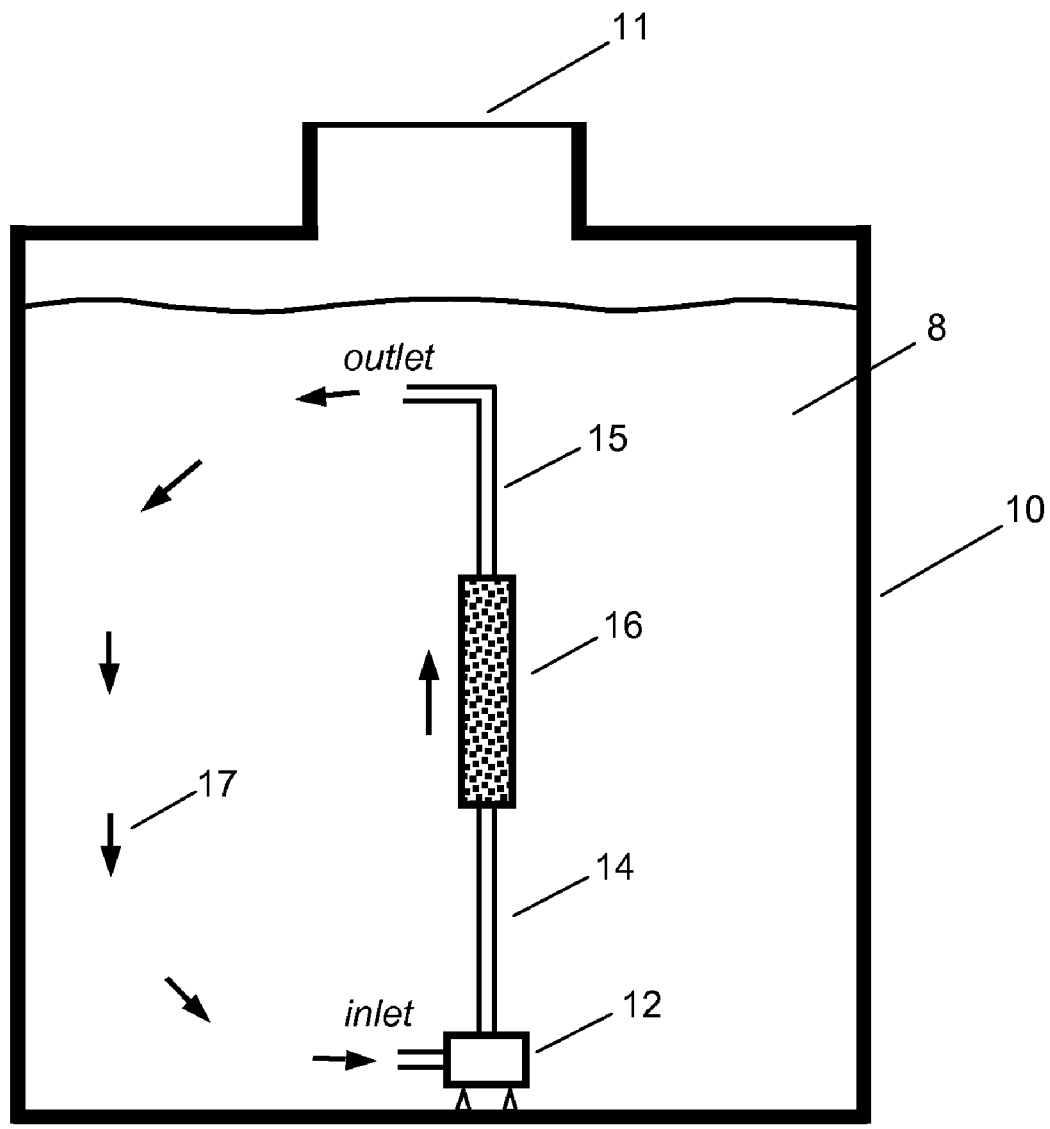
FIG. 1 shows a schematic cross-section side view of an example of an in-tank recirculating arsenic filtration system.

FIG. 1 shows a schematic cross-section side view of an example of an in-tank recirculating arsenic filtration system that has been manually lowered into tank 10 through a port 11 in the top. Submersible pump 12, resting on the bottom of the tank, continually recirculates the storage tank water 8 through a vertically-oriented filter column 16 containing arsenic-sorbing media, thereby removing (sequestering) arsenic from the water in the tank 24 hours a day, 7 days a week. Piping 14 connects pump 12 to filter 16. Outlet piping 15 releases the treated water near the top of the tank, in order to create a well-mixed internal recirculation flow loop 17. Internal piping can be made of low-cost PVC piping. Not shown is electric power supplied to the pump.

Figure 2:
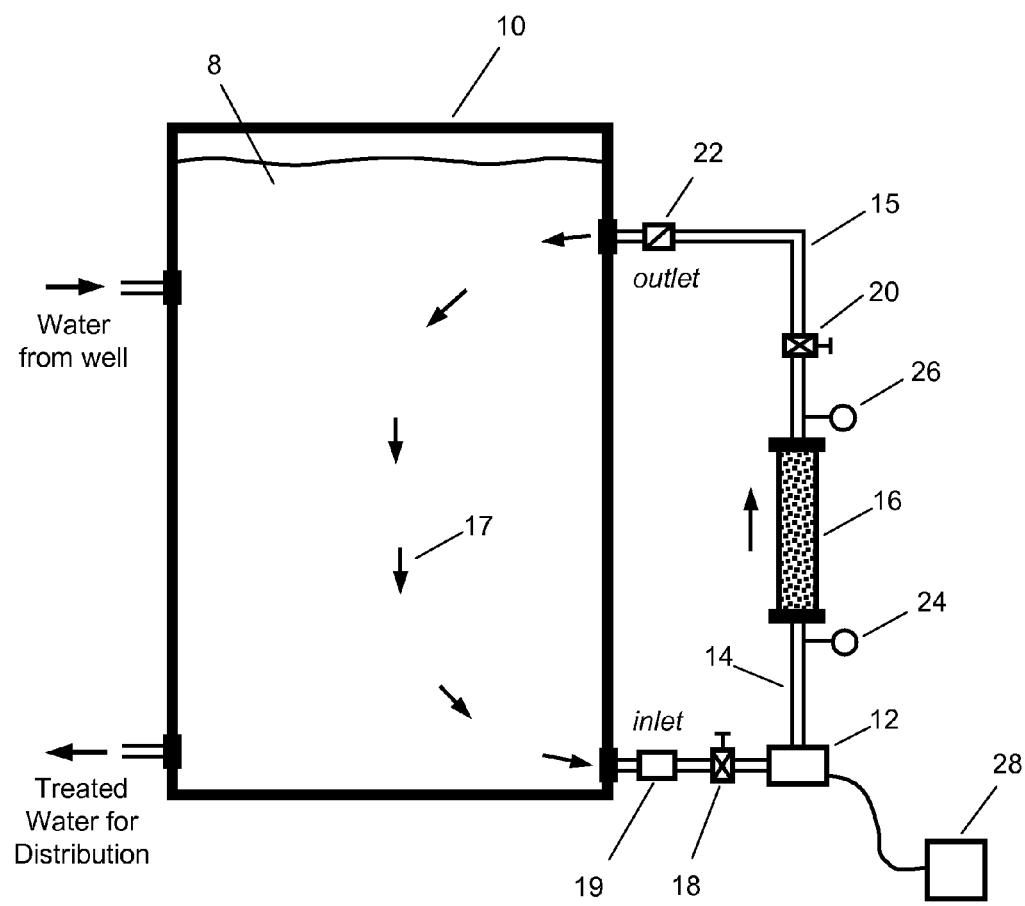
FIG. 2 shows a schematic cross-section side view of an example of an out-of-tank recirculating arsenic filtration system.

FIG. 2 shows a schematic cross-section side view of an example of an out-of-tank recirculating arsenic filtration system that has been attached to the outside of the tank 10. Water is drawn from the bottom of tank 10, past water meter 19, ball valve 18, through pump 12, piping 14, vertically-oriented filter bed 16 containing arsenic-sorbing media, up through valve 20 and past check-valve 22, where it is dumped into the top of tank 10, where it mixes with water 8 and then recirculates back down to the bottom via internal recirculation loop 17. Power supply 28 supplies power to pump 12. On the left side of tank 10, arsenic-contaminated water flow to the top of tank 10 from a well, and treated water leaves the tank at the bottom for distribution.

In the specification, the phrase "in-tank" refers commonly to two types of systems, as illustrated in FIGS. 1 and 2, where the pump and filter column are located either inside of (i.e., In-Tank), or outside of (i.e., Out-of-Tank) the water storage tank. The phrase "in-tank" means that the water being treated (e.g., by removing arsenic contamination) stays within (or, is returned to . . . ) the storage tank during treatment; and that the water is recirculated through the treatment column multiple times (passes) before being ultimately distributed to the user. This "in-tank" system is a fundamentally different method and system than a conventional once-through treatment system, i.e., where the water leaves the storage tank, then is treated and finally distributed to the user . . . without the treated water ever being returned to the storage tank.

Another option would be to have the pump located inside the tank, and the treatment column located outside; or the other way around: the treatment column located inside, and the pump outside.

Each In-Tank Arsenic Removal System (ITARS) can run continuously at about 0.5-20 gpm, and can process 720 to 28,800 gallons/day of arsenic-contaminated drinking water. The filter media is envisioned to be a uniformly-sized, large-grained fixed bed sorbent that would have to be removed on a monthly to yearly basis. A rigid bed sorbent, such as a ceramic, or packed zinc, iron, or copper wire, brass wire, steel wool, would be most likely to not clog the filter bed (however, granular metal oxides and hydroxides, granular hydrous iron oxide, various silicates and zeolite-like substances, activated carbon and charcoal in its various forms, and conventional synthetic organic ion exchange media may be used as well). A material possessing a capacity of 1 mg As uptake per gram of media would last from a few months to a year, depending on the level of arsenic contamination. Water supplies with low As levels would need only run the ITARS for short intervals. The filter bed is expected to hold roughly 25 Kg of media (maximum). The filter bed can be placed upright, above the pump, so that water inputs keep any granular media in-suspension. Alternatively, the filter bed can be oriented horizontally, or at some intermediate angle in-between horizontal and vertical.

Figure 3A:
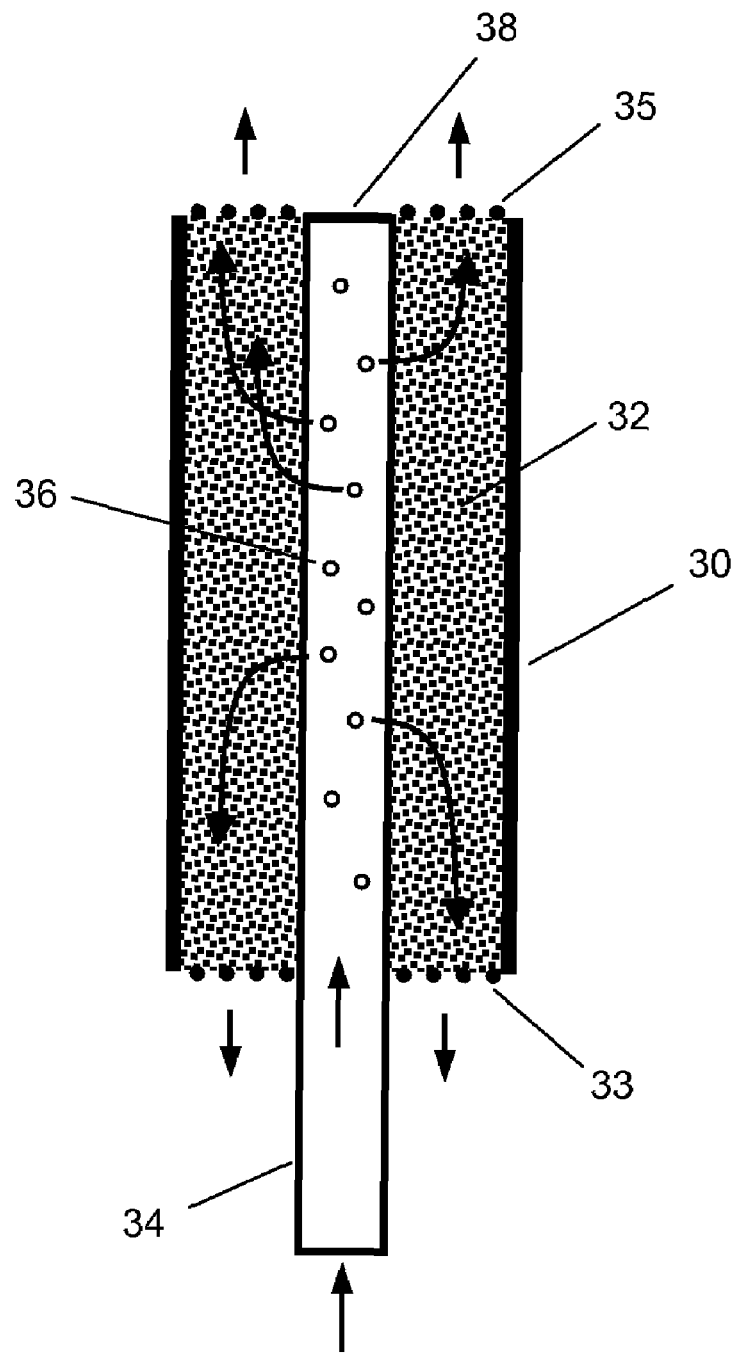
FIG. 3A shows a schematic cross-section side view of an example of a pressurized in-tank granular arsenic filtration system with combined axial and radial flow.

FIG. 3A shows a schematic cross-section side view of an example of a pressurized in-tank granular arsenic filtration system, with combined axial and radial flow. Arsenic sorption media 32 is contained within a solid-wall sleeve/tube/cartridge 30 that is open to flow at both ends. Screen/mesh pieces 33 and 35 are placed across the open ends of sleeve 30 to hold the granular filter media 32 in place. Water to be treated flows up through a central feed pipe 34, which has numerous holes/perforations 36 in the upper end to let the water flow radially outwards into the filter media 32. This water flows radially outwards, and then axially towards the two open ends of outer sleeve 30. The upper end of feed pipe 34 is closed-off with an end cap 38.

Figure 3B:
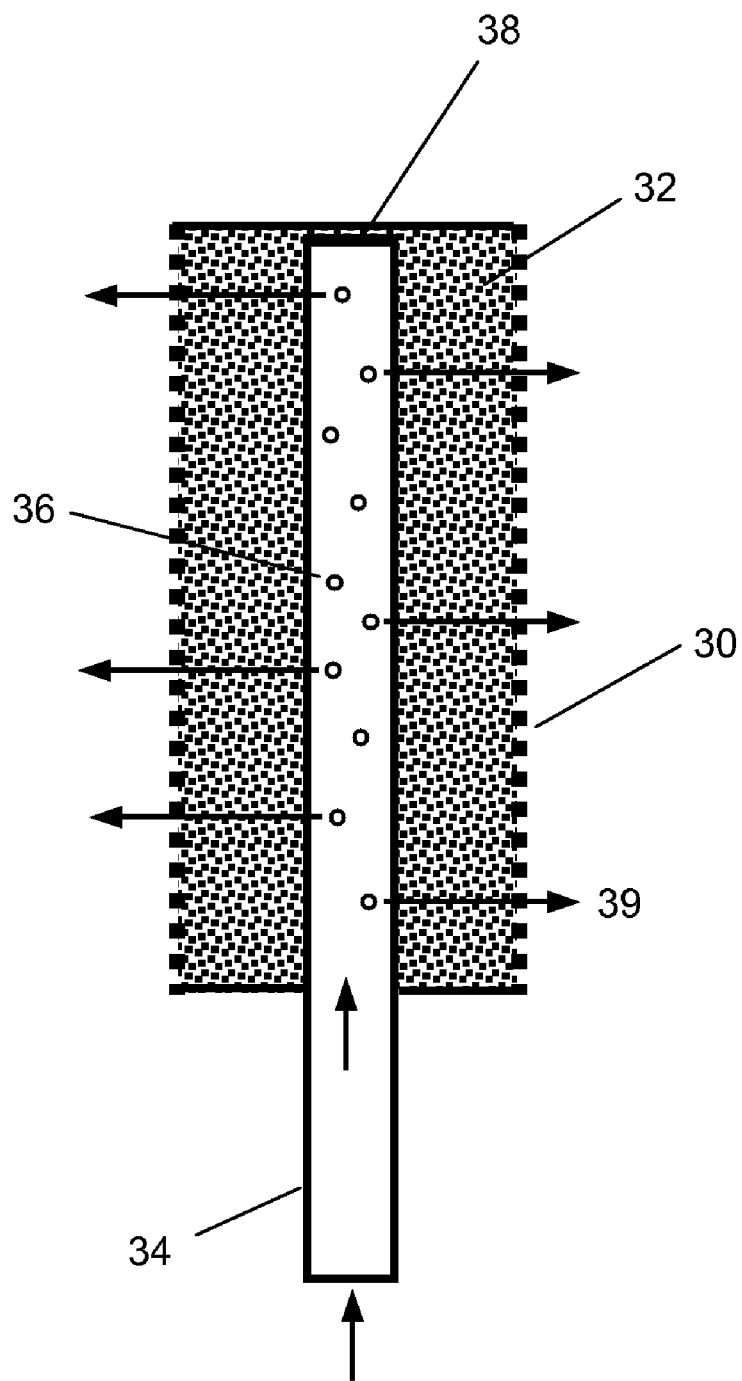
FIG. 3B shows a schematic cross-section side view of an example of a pressurized in-tank granular arsenic filtration system with radial flow.

FIG. 3B shows a schematic cross-section side view of an example of a pressurized in-tank granular arsenic filtration system with radial flow. This is the same as shown in FIG. 3A, except that the outer sleeve is perforated. This allows the treated water 39 to flow radially outwards after passing through the filter media 32, resulting in a lower pressure drop from inlet to outlet, as compared to the design shown in FIG. 3A.

Figure 4:
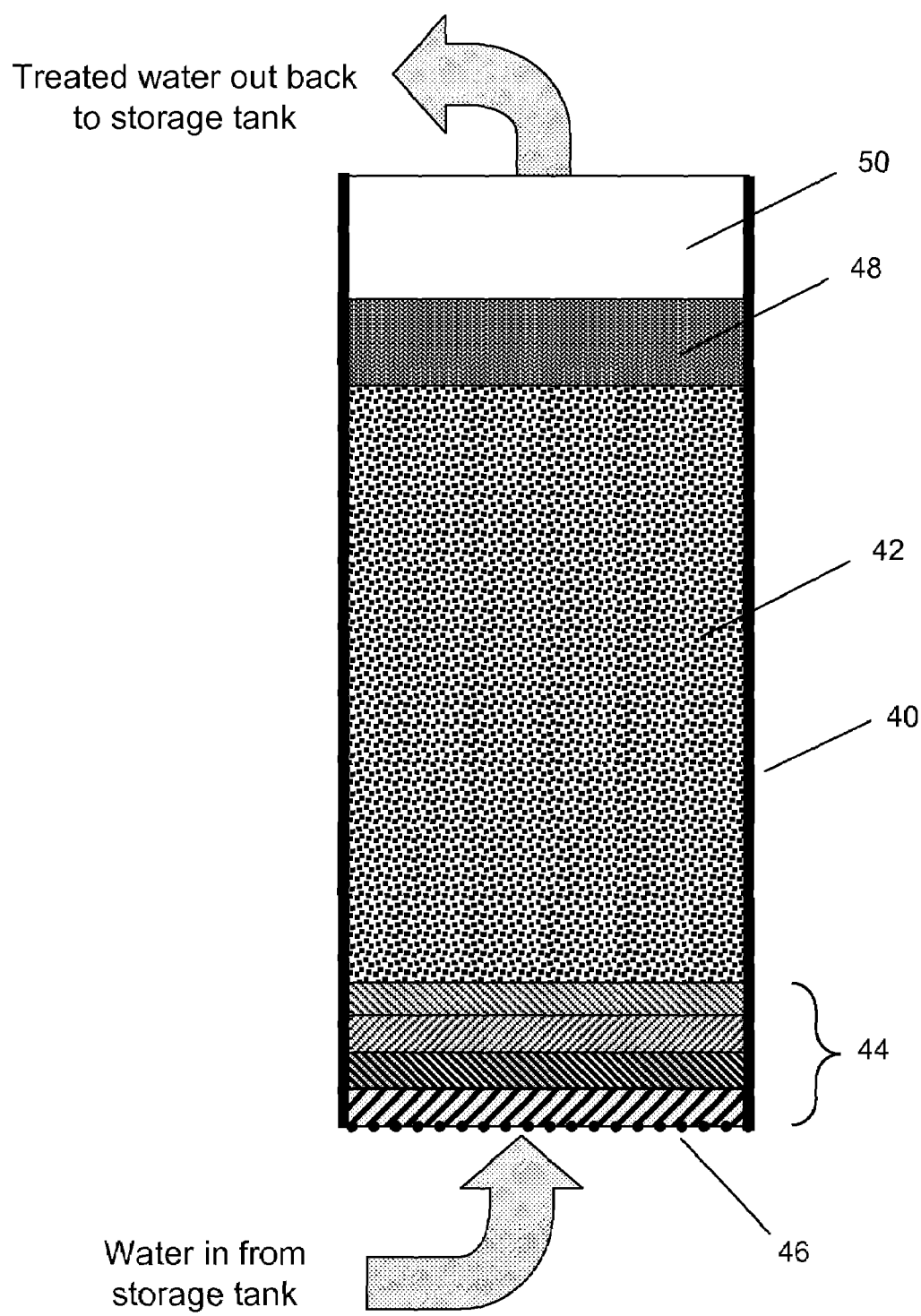
FIG. 4 shows a schematic cross-section side view of an example of a pressurized in-tank granular arsenic filtration system with axial flow.

FIG. 4 shows a schematic cross-section side view of an example of a pressurized in-tank granular arsenic filtration system with axial flow. Granular contaminant removal media 42 is contained within solid-wall sleeve/tube/cartridge 40 that is open to flow at both ends. Screen/mesh piece 46 is placed across the lower open end of sleeve 40 to hold the granular filter media 32 in place. Screen 46 can be a 60 mesh stainless steel screen. Water from the storage tank enters from the bottom, flows axially upwards through the various layers in the cartridge 40, and exits from the top as treated water back to the storage tank (not shown). Near the bottom of cartridge 40 are several layers of relatively-high density gravel 44 that support the smaller, less-dense granules of contaminant removal media 42 above. Gravel 44 also serves to evenly distribute the incoming water to enhance uniform flow velocity (i.e., uniform across the radius of the column) and flow patterns through the media 42; thereby preventing undesirable flow channeling. Above the removal media 42 is a layer of anthracite 48, or other low-density, inert material, which serves to confine the treatment media below. Freeboard open volume 50 is located above the anthracite layer 48. Optionally, the freeboard space can be eliminated. In general, the media should be packed into the column and restrained to prevent agitation of the media, which tends to create fines.

The ITARS could be built and run at minimal cost (probably <$50 per year per family) and might be particularly useful for small systems (100 families or less). The cost of the pump would be less than $300. Annual power costs would be less than $200. Filter media are expected to cost less than 100 $/yr. Spent media could be disposed of in a landfill—or regenerated for nominal cost. A large system could also achieve lower As levels using multiple ITARS.

The major cost savings relative to existing approaches occurs because no operators or new constructions would be needed (in contrast, a traditional As treatment system using a filter assemblage at the outlet must be able to treat peak load output flow of water in a single once-thru pass). The approach might also be applied to remove contaminants other than arsenic, e.g., chromate, perchlorate, heavy metals, TCE, PCE, selenium, vanadium, $PO_4$, and radionuclides.

The ITARS design is unique from other, traditional contaminant removal approaches because it uses the water storage tank as the reaction vessel; and provides the opportunity for multiple passes of tank water through the sorption media by continuous recirculation.

Upon startup of the recirculation column, the arsenic concentration in the well water will be at normal ambient levels; however, once the desired steady state concentration in the tank is attained, the relatively large storage tank volume acts to buffer fluctuations in the arsenic levels in the distribution water. Output arsenic levels are maintained by optimizing the flow rate through the media column. The ability to control the output concentration provides a significant advantage by only removing enough arsenic to meet the 10 ppb MCL (maximum contaminant level) requirement thereby enhancing the media utilization, which extends media life.

Spent media change out at pre-determined intervals involves removing the filter-treatment vessel, emptying out the spent media and disposing of it in a landfill, re-filling the filter bed column with fresh media, and reinstalling the vessel. Alternatively, fresh pre-manufactured columns could be exchanged for exhausted columns, which could be recharged by the manufacturer or disposed of. The change out frequency is one critical determinant of the economic feasibility of the approach. The proposed system will likely require more frequent media change outs than a conventional system because much less media is in use; however, the change outs will be much easier due to the ease of handling the relatively small treatment column and media contents. The change out frequency will ultimately depend on the arsenic uptake capacity of the media ($As_{max}$; mg As/g media), which is a function of the media type, empty bed contact time (EBCT: minutes), and the chemistry of the water. A Level I or II operator would suffice for system O & M.

The in-tank treatment approach is based upon conventional adsorptive column design principles and uses commercially available media, yet has several distinct advantages. Table 1 summarizes similarities and differences.

TABLE 1

Comparison of Convention vs In-Tank Systems

| Treatment System Characteristics | Conventional | In-tank System |
|---|---|---|
| Treats water in a single pass through filter bed on demand | X | |
| Treats water in multiple passes through filter bed continuously/ | | X |
| Media volume (treatment vessel size) | Size must be large enough to meet design peak demand flow rate in single pass | Size can be much smaller due to continuous treatment (multiple passes) |
| Hydraulic loading rate (water velocity through column) | 6-8 gpm/ft² | 12-20 gpm/ft² |
| Media utilization rate | Fixed rate | Potentially better utilization due to higher water velocity |
| O&M Training requirements | Level II or higher | Level I |
| Infrastructure requirements | Building, power, pump pressure vessels, piping, instrumentation and appurtenances | Media column, power, pump, piping, valving and appurtenances |
| Media change out frequency | 1-2 times/year | 3-4 times/year (estimate) |

We can estimate the range of applicability of in-tank adsorption and define the critical input variables. Again, the focus is on small communities of a hundred connections or less. The absolute volume of a community water tank that can be treated is determined primarily by the weight of the media vessel two personnel can manage for change outs and, to a lesser degree, by the pumping rate of the in-tank system. Assuming that the in-tank system effluent arsenic level is 0 ppb until the adsorbent media is close to exhaustion, the flow rate and steady-state tank arsenic concentration can be estimated by considering the mass balance of arsenic in the tank:

$$\frac{dC_t}{dt} = q_{in}C_{in} - q_{out}C_t - q_pC_t = 0 \quad (1)$$

$$q_{in} = q_p(C_t/(C_{in} - C_t)) \quad (2)$$

Where:

$C_t$ is the steady state concentration of arsenic in the tank (mg/L)

$C_{in}$ is the arsenic concentration in the tank influent $q_{in}$ is the flow rate of water into the tank (L/day; at steady state $q_{in} = q_{out}$ the daily amount of water distributed to the community)

$q_p$ is the pumping rate through the in-tank filter.

Assuming a typical daily water usage of 200 gallons/day per person (757 L/day per person), an effluent arsenic ($C_t$) of 8 ppb (0.008 mg/L), and a filter media density of 0.8 kg/L (50 kg of filter media amounts to ~62.5 L of bed volume). The equations above can be used to estimate the number of people served (based on 200 gpd per connection) as a function of influent arsenic level and empty bed contact time. Results indicate that higher EBCT (lower $q_p$) decreases the overall system capacity. Most adsorption media are used with EBCTs greater than 2 minutes; therefore, verifying performance at the more desirable, lower, EBCT is critical. Also, $As_{max}$, the capacity of the arsenic adsorptive media (mg arsenic/g media) must be established at low EBCTs. Note lastly that system capacity is higher for lower input arsenic levels and that influent arsenic levels above ~25 ppb probably cannot be treated effectively by this approach. Within New Mexico over half (~52%) of the small water systems have arsenic levels in the 10-25 ppb range.

The change out frequency can likewise be estimated as a function of system capacity and influent arsenic levels, assuming a filter media mass of 50 kg:

Change out time (days) =

$$\frac{50000 g * As_{max}(mg/g)}{\text{Capacity (people)} * (757 L/\text{day} * \text{person})(C_{in} - C_t)(mg/L)} \quad (3)$$

Figure 5:
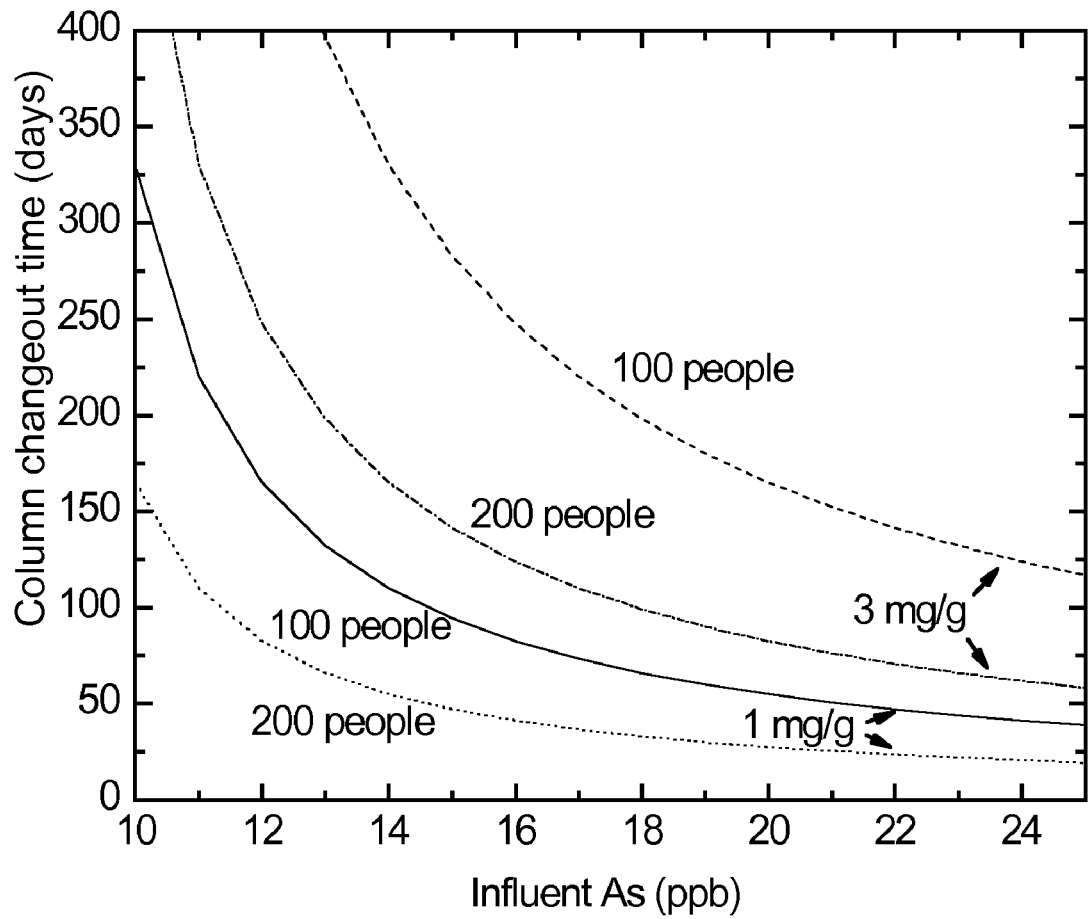
FIG. 5 shows the calculated filter change out time as a function of system capacity, influent arsenic levels, and adsorptive media capacity.

Estimated filter bed change out times is shown in FIG. 5 as a function of system capacity (number of people) and the filter media capacity. Note that the latter number is uncertain particularly at the lower EBCTs mentioned above. Conventional pilot testing conducted by Sandia National Laboratories has shown adsorptive media capacities for the ArsenXnp media ranged from 0.8 to 2.33 mg As/g media depending on the water quality. Full-scale systems typically range from 1 to 2 mg As/g media for GIM.

Field Testing

Operation of the column at short EBCT and high hydraulic loading rates allows an installation that uses a much reduced volume of adsorbent medium yet provides a reasonable treatment interval between media changeouts. The absence of large capital and operator costs suggests that the cost of in-tank adsorption is significantly smaller than the conventional approach for small communities. The magnitude of the savings is evident in the following example. Assume the annual per person media usage to treat a water containing 20 ppb arsenic down to 10 ppb can be estimated to be roughly 1.5 kg (this assumes $As_{max}$=3 mg/g). ArsenXnp, an iron-based media, is sold at $15.40/kg, suggesting a rough per person annual media cost of ~$23. Power to run the pump and disposal costs would add another $25/year resulting in overall costs substantially lower than that of existing approaches.

A pilot scale test conducted in Rio Rancho, N. Mex. was performed to evaluate the in-tank arsenic removal concept. Testing verified the influence of EBCT on $As_{max}$ under actual operating conditions and provided the information necessary to accurately estimate system costs.

The pilot tests consisted of treatment of Rio Rancho, N. Mex. well water with an initial arsenic concentration of approx. 20 ppb, using a continuously recirculating flow through an externally mounted adsorption column containing ArsenXnp media provided by Purolite. Chlorinated source water was pumped into a storage tank, withdrawn from the storage tank for treatment, and then returned to the tank for distribution. Water was fed to the storage tank at the top, withdrawn to the recirculation treatment column from near the bottom opposite side of feed via a pump at a constant flow rate. Water exiting the recirculation column was returned to the storage tank at the feed location so that feed water and treated water mixed upon entering the storage tank. Water was also withdrawn from the bottom of the tank with a separate pump to simulate distribution.

Table 2 lists the test parameter values for the Rio Rancho pilot. In order to simulate an actual community water usage pattern, the distribution flow rate varied from 0.22 gpm for 19 daily hrs (off peak) to 0.44 gpm for 3 daily hours (med. peak) to 0.66 gpm for 2 daily hours (peak). This demand pattern pumped 365 gal/day from the tank, which was continuously replaced with untreated source water.

TABLE 2

Rio Rancho Pilot test parameters

| Parameter | US | | Metric | |
|---|---|---|---|---|
| Storage tank volume | 950 | gal | 3595 | L |
| Input flow rate | 365 | gal/day | 1382 | L/day |
| Average distribution flow rate | 365 | gal/day | 1382 | L/day |
| Recirculation column flow rate | 522 | gal/day | 1976 | L/day |
| Recirculation column inside diameter | 2 | in | 5 | cm |
| Recirculation column length | 20.8 | in | 52.8 | cm |
| Recirculation column volume | 0.038 | ft³ | 1.075 | L |
| Hydraulic loading rate | 16.5 | gpm/ft² | 814 | L/m² |
| Empty bed contact time (EBCT) | 0.78 | min | 0.78 | min |
| Density of adsorption medium | 50 | lbs/ft³ | 0.8 | g/cm³ |
| Weight of adsorption medium | 1.89 | lbs. | 858 | g |
| Medium arsenic capacity (assumed) | 0.003 | lbs./lbs. | 3 | mg/g |

In association with this pilot testing we simulated the performance of a recirculation column system using the full time dependent model of the steady state calculations shown above. The model uses a set of coupled differential equations to describe the time dependence of the volume of water in the tank, the amount of arsenic adsorbed on the column, and the concentration of arsenic in the tank (to distribution) given by:

$$\frac{dV}{dt} = q_{in} - q_{out}$$

$$\frac{dAs_t}{dt} = qC_{in} - (q_{out} + q_p P)\frac{As_t}{V}$$

$$\frac{dAs_c}{dt} = q_p P \frac{As_t}{V}$$

Where:
V is the volume of water in the tank;
$As_c$ is the instantaneous weight of arsenic in the column;
P is the saturation function for the adsorber;
$As_t$ is the arsenic weight of As in the tank ($C_t=As_t/V$)
$As_{max}$ is the capacity of the absorber.

Figure 6:
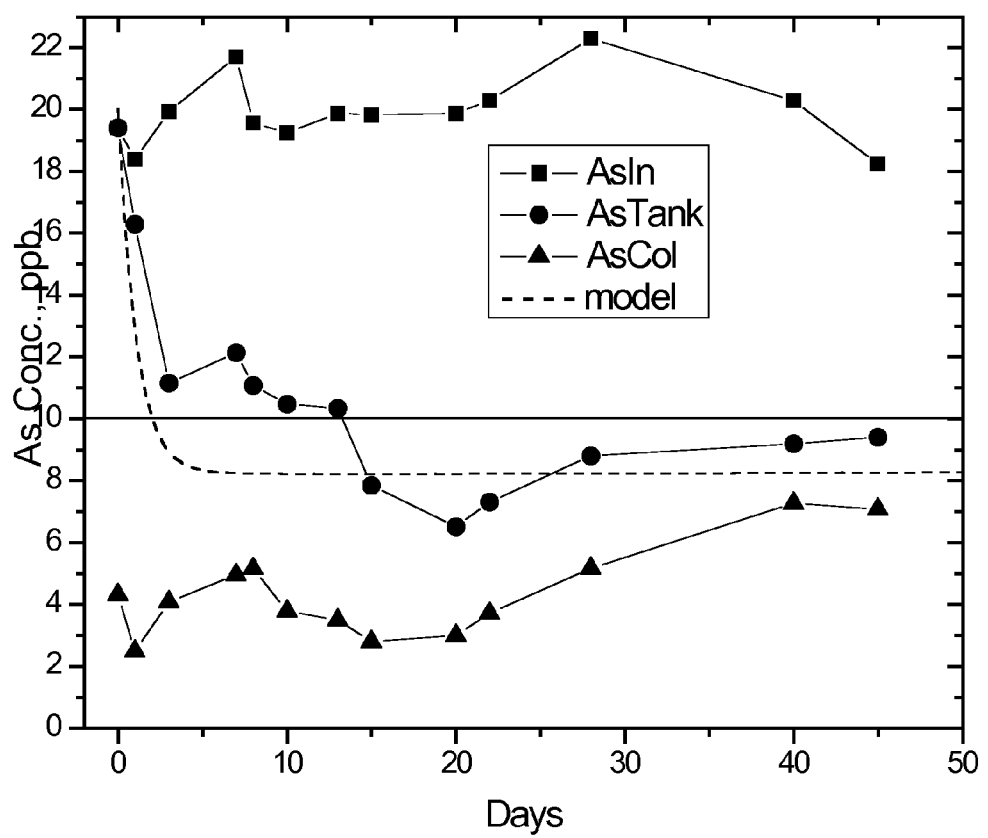
FIG. 6 shows the experimentally measured arsenic concentration in feed, tank, and column effluent as a function of time; model prediction for tank concentration is shown as a solid line.

We used an empirical expression that roughly describes observed breakthroughs: $P=1-(As_t/As_{max})^4$, to account for media saturation. These expressions were integrated numerically using MATHCAD for the conditions of the pilot tests. FIG. 6 shows the results of the pilot test over a 45 day period, measuring arsenic concentrations of the feed, tank effluent (distribution), and column effluent (recirculated).

Initially the filled tank is at the feed concentration of ~20 ppb. The tank concentration drops during the first few days of treatment, reaching a steady state of ~8 ppb after 15 days. The column effluent during this time is relatively constant at ~4 ppb. The time it takes to reach steady state reflects the time required to remove arsenic from the relatively large initial volume of the storage tank, as well as the continuously replenished source water. The test was carried out for 45 days before termination. At 45 days the tank concentration remained below 10 ppb, and the recirculation column had not yet reached breakthrough. Integrating the total arsenic adsorption from the pilot data indicates that the total amount of arsenic adsorbed on the column during the test was ~1.2 mg As adsorbed/g of media, suggesting that significant capacity remained in the recirculation column, and the test may well have proceeded for a significant additional length of time before breakthrough.

Note that the arsenic concentration in the recirculation column effluent is higher than is generally observed in a conventional once-through treatment system using an EBCT of two to five minutes. A likely explanation for this is that the higher HLR and shorter duration EBCT result in insufficient time for thorough arsenic mass transfer from the water to the adsorptive media resulting in a significant amount of arsenic 'leakage' through the column. Controlling the amount of leakage will also allow control of the arsenic level in the distribution water to a specified value below the MCL. This will extend the life of the adsorbent medium compared to conventional adsorption.

Once the tank attains steady state, significant variations in input or output have minimal effect on the tank arsenic concentration. The relatively large tank volume provides the ballast capacity to maintain a relatively constant arsenic concentration, even with variations in demand, as simulated in the withdrawal schedule outlined above.

Figure 7:
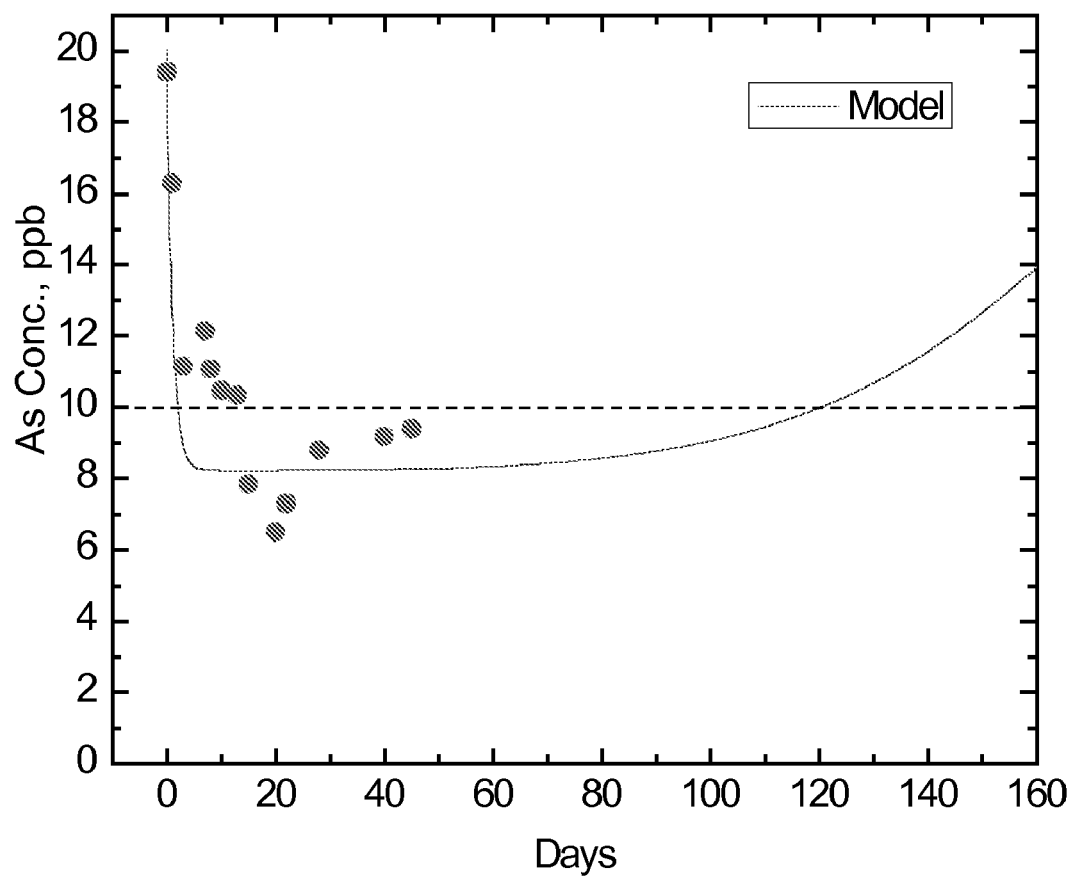
FIG. 7 shows the predicted breakthrough curve for the recirculation column test based on an adsorber capacity of 3 mg/g; with experimentally measured tank concentrations for the 45 day pilot test shown as solid dots.

The model calculations using the equations above and pilot testing parameters are shown as the solid blue line in FIGS. 6 and 7. The only variation from the experimental protocol was that the feed and distribution flows in the simulations are held constant ($dV/dt=0$). Other than this, all conditions are identical to the pilot tests. The simulations also show the tank concentration dropping rapidly from an initial 20 ppb input to a steady state at ~9 ppb after about 5 days. At the end of the pilot test, the simulations suggest that we are still in the steady state regime. To estimate the actual time to breakthrough, we extended the simulations to longer periods, shown in FIG. 7.

The media capacity is predicated on experience with this media in conventional (once-through) arsenic adsorption column testing and represents the estimated capacity to breakthrough at 10 ppb. In the model, this parameter represents the capacity at exhaustion of the adsorber, which we assumed to be 3 mg arsenic adsorbed/g media, giving a predicted arsenic uptake at breakthrough of ~2.2 mg/g. This is consistent with observed breakthrough capacities of 1-3 mg/g on once-through pilot and full-scale systems. The predicted time to breakthrough at 10 ppb is approximately 120 days, in agreement with equation (3) above.

The model generally captures the essential features of the pilot data. An initial period is required to reduce the concentration of the tank to levels below the MCL of 10 ppb. Afterwards a steady state is maintained until breakthrough. The time constant for this initial drop and the value of the steady state concentration depends on the size of the tank and the relative input, output and recirculation flow rates. A larger tank and higher input and output flows will result in a longer time constant and higher steady state concentration. In designing an actual system the size of the tank, recirculation column size, and recirculation flow rates must be chosen appropriately to give adequate time response and sufficient margin of arsenic concentration below the 10 ppb limit. Oscillation in-tank concentration due to fluctuating supply or demand flows and tank volume must also be considered.

The choice of saturation function, P, in the model above assumes that all arsenic is adsorbed until the medium begins to become saturated. The P factor was empirical and generally mimics the observed behavior of many breakthrough curves. The slope of the breakthrough curve in the saturation region depends on the value of the exponent selected for P. This will affect somewhat the total time to breakthrough and saturation. This functional form also does not account for 'leakage' of arsenic through the column as observed in the pilot tests. The degree of arsenic leakage affects the time constant for the initial decline and the value of the steady state concentration in the tank. While the steady state calculations shown above indicate that lower EBCT should increase the capacity of the system, this leakage of arsenic through the recirculation column limits the EBCT that can be employed. In bench and pilot tests of the system EBCTs below 0.5 minutes resulted in excessive leakage of arsenic and an inability to reduce the arsenic concentration in the tank to acceptable levels.

The arsenic capacity of the adsorption medium needs to be investigated further as well. The pilot data indicate that adsorption capacities observed in once-through systems may apply to multi-pass systems as well. Operating an arsenic treatment pilot study to breakthrough and media exhaustion would serve to confirm this.

At this point, we compare the performance of the in-tank recirculating system to a conventional once-through system. For a pilot installation of the same size as tested here, a once-through system needs to be able to handle a peak flow of 0.66 gpm, with a typical EBCT of 3 minutes. This requires an adsorber bed volume of 7.5 liters, and 6 kg of adsorbent medium. Assuming an equivalent arsenic capacity of 2.2 mg/g to breakthrough, and a column effluent arsenic concentration of near zero, the total volume of treated water is $1.7 \times 10^5$ gal, with an estimated time to breakthrough of 336 days, at an average flow rate of 0.36 gpm. This is in contrast to the in-tank system, which uses only 0.8 kg of adsorbent medium, with a time to breakthrough of 120 days. Expressed in terms of days/kg of medium, the once-through system achieves 56 days/kg, while the recirculating system delivers 140 days/kg. These estimates are summarized in Table 3.

TABLE 3

Comparison of recirculating and conventional once-through methods for the Rio Rancho pilot specifications

|  | Recirculating | Conventional |
|---|---|---|
| Maximum flow rate, gpm | 0.36 | 0.66 |
| EBCT, min | 0.78 | 3 |
| Adsorber volume, liters | 1.1 | 7.5 |
| Adsorber weight, kg | 0.86 | 6 |
| Adsorber capacity, mg/g | 2.2 | 2.2 |
| Influent As conc., ppb | 20 | 20 |
| Effluent As conc., ppb | 8 | 0 |
| Days to breakthrough | 120 | 336 |
| Days/kg of absorbent | 140 | 56 |

This analysis indicates the in-tank system can operate with a much smaller volume (and weight) of adsorbent, albeit with a more frequent change out. The in-tank recirculating system also achieves more than a factor of two improvement in efficiency (in terms of treated water delivered per unit weight of adsorbent medium). These improvements stem primarily from two factors: a) sizing of the system to meet the continuous flow rate and short EBCT of the in-tank absorber rather than the peak flow demand and large EBCT of the once-through system, and b) the ability to select the final arsenic concentration (in this case 8 ppb) rather than removing essentially all the arsenic in the once through system.

Design of a Small Community System

Based on these pilot and modeling results, we can estimate the size, operating conditions, and costs for an in-tank arsenic treatment system for a small community, defined as 100 users, or 20,000 gallons per day. We desire a time to breakthrough of at least 90 days (3 months), given a source arsenic concentration of 16 ppb, and treated arsenic concentration of 8 ppb.

Using the pilot design parameters of EBCT ~0.7 minute, and tank volume 1.5 times the daily distribution volume, we can estimate the amount of adsorbent medium required by an in-tank treatment system using equation (2), and the time between change out of adsorption columns from the full model. The results of such a calculation give 65 lbs. of adsorbent medium, with an estimated change out time of 122 days.

System specifications can be adjusted for different arsenic tank concentrations, with concomitant changes in time to breakthrough. The actual capacity of the adsorber will influence the time to breakthrough as previously mentioned.

A comparison of estimated costs for conventional arsenic water treatment systems and the in-tank alternative arsenic treatment system are provided below. The conventional system cost estimates are based on cost curves previously developed by the American Water Works Association (AWWA) for three technologies based upon EPA's Best Available Technologies (BAT): ion exchange (IX), activated alumina (AA), and coagulation/microfiltration (CMF). Cost estimation curves are not yet available for the fourth conventional technology—granular iron oxide media (GIM); however, data from vendors, pilot and full-scale systems was used for the GIM estimate. AWWA cost curves for capital and O & M estimating were prepared using industry standard cost estimating practices, references, costs of similar projects, and material quotes from vendors. The costs are Budget Level Estimates, as defined by the American Association of Cost Engineers. The components for capital and O & M costs are shown in Table 4.

Annualized cost calculations allow for comparison of technology options that have a non-uniform series of money disbursements occurring over the life of a project (Grant and Ireson, 1960). The annualized cost calculations produce an equivalent uniform annual cost (EUAC) using the following equation (Grant and Ireson, 1960):

$$EUAC = (\text{Capital cost})\{(\text{interest rate})(1+\text{interest rate})^{period}/((1+\text{interest rate})^{period}-1)\} + (\text{O\&M costs})$$

A 20-year life cycle is used by AWWARF and EPA in cost estimates. Considering the In-tank adsorber operates continuously outside of a permanent structure the life cycle has been reduced to 3 years. The EUAC for the IX, AA, and CMF options appear unreasonably high, this is likely the result of the low design flow rate (0.02MGD) used for the calculations. The flow rate is at the very low end of cost curves that were developed for much larger systems and consequently it appears that the cost estimates are skewed at the low end of the curves.

The In-tank adsorber and the GIM alternative estimates are more appropriate for a small water system. The annual cost for the In-tank treatment system is approximately one-third of the GIM option supporting the notion that the smaller the system the more appropriate the In-tank treatment system becomes. The In-tank adsorber realizes significant capital

TABLE 4

Comparison of Arsenic Treatment Technology Costs.

| Cost Component | IX | AA | C/MF | GIM | In-tank adsorber |
|---|---|---|---|---|---|
| Treatment Technology | | | | | |
| Booster pump | X | X | X | X | X |
| Straining | X | X | X | X | |
| Facility | X | X | X | | |
| Equipment | (Brine Handling) | (Waste Caustic/AA precipitation) | (Rapid Mix, microfiltration) | | |
| Solids Handling | X | X | X | X | X |
| Chemical Feed Systems | X | X | X | | |
| Building | X | X | X | X | |
| Piping, I&C, Electrical, Yard piping allowances | X | X | X | X | X |
| Contingency -20% | X | X | X | X | X |
| Cost Estimate | | | | | |
| Capital | $^a$$2,144,000 | $^b$$2,202,600 | $^c$$1,945,300 | $^d$$159,020 | $^e$$8407 |
| O&M | $^a$$149,875/yr. | $^b$$130,175/yr. | $^c$$122,492/yr. | $^d$$9026/yr. | $^e$$4361/yr. |
| Life Cycle (period in years) | 20 | 20 | 20 | 20 | 3 |
| Equivalent Uniform Annual Cost (EUAC) * | $306,889 | $292,163 | $265,471 | $20,714 | $7,390 |

$^a$AWWARF Cost curves (Frey, et al. 2000),
$^b$AWWARF Cost curves (Frey, et al. 2000),
$^c$AWWARF Cost curves (Frey, et al. 2000),
$^d$Developed from vendor price estimates,
$^e$Developed from vendor price estimates using Sandia National Laboratories In-tank column design,
* interest rate = 4%.

cost savings by not requiring a building, strainer equipment and the associated installation costs, utilizing a smaller pump (much smaller setup has smaller pumping requirements), less piping, instrumentation and related appurtenances. This also results in a substantial O&M cost savings primarily due to less equipment to operate and maintain.

General rules of thumb can be used to help size the system. For example, the ratio of the flow rate of the water distribution system (treated water for users) to the flow rate of the recirculating treatment system (filter column) can range from 1:1.1 to 1:1.5. Another rule of thumb is that one tank volume of stored water will be turned over (i.e., recirculated) every 1.5 to 2 days.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A water treatment system, for reducing the levels of a contaminant in water stored in a storage tank; comprising:
   a water storage tank;
   a recirculation pump;
   a treatment column, containing contaminant-sorbing media;
   piping means for recirculating water from the storage tank to the recirculation pump, then through the treatment column, and then back to the storage tank;
   wherein the water continuously recirculates through the treatment column, thereby reducing the level of contamination in the water after multiple passes through the treatment column; before any treated water is distributed from the storage tank to users;
   and wherein the treatment system is not a once-through treatment system.

2. The system of claim 1, wherein the contaminant-sorbing media is granular; and the treatment column is oriented vertically, and is located above the level of the pump.

3. The system of claim 1, wherein the recirculation pump, treatment column, and piping means are located inside of the storage tank.

4. The system of claim 1, wherein the recirculation pump, treatment column, and piping means are located outside of the storage tank.

5. The system of claim 1, wherein the recirculation pump is located at the bottom of the storage tank; and treated water discharged from the treatment column is discharged near the top of the storage tank, to promote good internal mixing.

6. The system of claim 1, wherein the ratio of the flow rate of the water system to the recirculation flow rate through the treatment column is in the range from 1.1:1 to 1.5:1.

7. The system of claim 1, wherein the contaminant is arsenic, and the contaminant-sorbing media comprises arsenic-sorbing media selected from the group consisting of ceramic, packed zinc, iron, copper wire, brass wire, steel wool, granular metal oxides and hydroxides, granular hydrous iron oxide, silicates, zeolite-like substances, activated carbon, charcoal, and synthetic organic ion exchange media.

8. The system of claim 7, wherein the water treatment system is a small community water system with 100 connections or less; the storage tank is the community water storage tank; and the untreated water has an ambient arsenic contamination level of 11-25 ppb.

9. The system of claim 7, wherein only enough arsenic is removed to meet the 10 ppb MCL requirement.

10. The system of claim 7, wherein the hydraulic loading rate through the treatment column ranges from 12 to 20 gpm/$ft^2$.

11. The system of claim 7, wherein the arsenic removal capacity of the arsenic-sorbing media ranges from 1 to 3 mg As/g media.

12. The system of claim 7, wherein the recirculation flow rate through the treatment column is sufficiently high so that at least one tank volume turns over every 1.5 to 2 days.

13. The system of claim 7, wherein the empty bed contact time (EBCT) of the recirculating treatment column is greater than 0.5 minutes and less than 2 minutes.

14. The system of claim 7, wherein the breakthrough time of the treatment column is greater than or equal to 140 days/kg of arsenic-sorbing media.

15. The system of claim 1, wherein the water exiting the treatment column is returned to the storage tank at the feed location, so that feed water and treated water mix together upon entering the storage tank.

16. The system of claim 1, wherein the treatment column comprises a perforated feed pipe disposed along the central axis of the column and capped at the upper end of the pipe; and wherein the outer sleeve of the column has a solid wall and open ends at both ends; whereby water to be treated flows radially outwards from the central axis through the contaminant-sorbing media, exiting through the two open ends.

17. The system of claim 1, wherein the treatment column comprises a perforated feed pipe disposed along the central axis of the column; and wherein the outer sleeve of the treatment column is also perforated; whereby water to be treated flows radially outwards from the central axis through the contaminant-sorbing media, and radially outwards through the perforated outer sleeve.

18. The system of claim 1, wherein the treatment column comprises an axial-flow cylinder containing a lower level of media support gravel layers; the contaminant removal media in the middle, and a lower-density anthracite layer on top, held in place by a stainless-steel wire mesh screen support on the open ends of the cylinder.

19. A drinking water treatment system, for reducing the levels of arsenic contaminant in drinking water stored in a storage tank; comprising:
   a water storage tank;
   a recirculation pump;
   a treatment column, containing contaminant-sorbing media;
   piping means for recirculating water from the storage tank to the recirculation pump, then through the treatment column, and then back to the storage tank;
   wherein the water continuously recirculates through the treatment column, thereby reducing the level of contamination in the water after multiple passes through the treatment column; before any treated water is distributed from the storage tank to users;
   wherein the treatment system is not a once-through treatment system;
   wherein the arsenic-sorbing media is granular hydrous iron oxide; and the treatment column is oriented vertically, and is located above the level of the pump;
   wherein the recirculation pump, treatment column, and piping means are located inside of the storage tank;

wherein the ratio of the flow rate of the water system to the recirculation flow rate through the treatment column is in the range from 1:1.1 to 1:1.5;

wherein the water treatment system is a small community water system with 100 connections or less; the storage tank is the community water storage tank; and the untreated water has an ambient arsenic contamination level of 11-25 ppb;

wherein only enough arsenic is removed to meet the 10 ppb MCL requirement;

wherein the hydraulic loading rate through the treatment column ranges from 12 to 20 gpm/ft$^2$;

wherein the arsenic removal capacity of the arsenic-sorbing media ranges from 1 to 3 mg As/g media; wherein the empty bed contact time (EBCT) of the recirculating treatment column is greater than 0.5 minutes and less than 2 minutes;

wherein the recirculation flow rate through the treatment column is sufficiently high so that at least one tank volume turns over every 1.5 to 2 days; and wherein the breakthrough time of the treatment column is greater than or equal to 140 days/kg of arsenic-sorbing media.

20. A water treatment system, for reducing the levels of a contaminant in water stored in a storage tank; comprising:

a water storage tank;

a recirculation pump;

a treatment column, containing contaminant-sorbing media;

piping means for recirculating water from the storage tank to the recirculation pump, then through the treatment column, and then back to the storage tank;

wherein the water continuously recirculates through the treatment column, thereby reducing the level of contamination in the water after multiple passes through the treatment column; before any treated water is distributed from the storage tank to users;

wherein the treatment system is not a once-through treatment system; and wherein the contaminant is selected from the group consisting of arsenic, chromate, perchlorate, heavy metals, TCE, PCE, selenium, vanadium, PO$_4$, and radionuclides.

21. A method for treating drinking water contaminated with arsenic, comprising:

providing a storage tank containing drinking water contaminated with arsenic;

recirculating water by pumping water from the tank through a treatment column containing granular arsenic-sorbing media, and returning the treated water back to the tank;

wherein sufficient arsenic is adsorbed by the arsenic-sorbing media to reduce the arsenic concentration to below 10 ppb.

22. The method of claim 20, wherein the arsenic-sorbing media is granular hydrous iron oxide; and the treatment column is oriented vertically, and is located above the level of the pump;

wherein the recirculation pump, treatment column, and piping means are located inside of the storage tank;

wherein the ratio of the flow rate of the water system to the recirculation flow rate through the treatment column is in the range from 1.1:1 to 1.5:1;

wherein the water treatment system is a small community water system with 100 connections or less; the storage tank is the community water storage tank; and the untreated water has an ambient arsenic contamination level of 11-25 ppb;

wherein only enough arsenic is removed to meet the 10 ppb MCL requirement;

wherein the hydraulic loading rate through the treatment column ranges from 12 to 20 gpm/ft$^2$;

wherein the arsenic removal capacity of the arsenic-sorbing media ranges from 1 to 3 mg As/g media; wherein the empty bed contact time (EBCT) of the recirculating treatment column is greater than 0.5 minutes and less than 2 minutes;

wherein the recirculation flow rate through the treatment column is sufficiently high so that at least one tank volume turns over every 1.5 to 2 days; and wherein the breakthrough time of the treatment column is greater than or equal to 140 days/kg of arsenic-sorbing media.

* * * * *